Feb. 11, 1964 H. R. WARD 3,120,800

BINARY PRINTER WITH DECIMAL DISPLAY

Filed June 22, 1962 2 Sheets-Sheet 1

INVENTOR.
HARLAN R. WARD
BY
Meyers & Peterson
ATTORNEYS

Feb. 11, 1964 H. R. WARD 3,120,800

BINARY PRINTER WITH DECIMAL DISPLAY

Filed June 22, 1962 2 Sheets-Sheet 2

INVENTOR.
HARLAN R. WARD
BY
Meyers & Peterson
ATTORNEYS

United States Patent Office 3,120,800

Patented Feb. 11, 1964

3,120,800

BINARY PRINTER WITH DECIMAL DISPLAY

Harlan R. Ward, Minneapolis, Minn., assignor to National Computer Systems, Inc., Minneapolis, Minn., a corporation of Minnesota Filed June 22, 1962, Ser. No. 204,559

6 Claims. (Cl. 101—72)

This invention relates generally to numbering machines, and pertains more particularly to a binary printer provided with a corresponding decimal display.

The principal object of the present invention is to permit a document to be serialized with a binary code as well as the decimal equivalent of the coded number, thereby producing on the document itself a language that is compatible with that of a computer system and at the same time providing the decimal equivalent thereof so that the document can readily be visually identified by inexperienced personnel.

Briefly, the invention envisages the arrangement of two numbering devices operating in parallel. One device or unit contains the binary information and the other contains the decimal equivalent thereof. Provision is made for actuating the two numbering devices in unison so that the second device will always print a number that can be visually recognized and which will correspond precisely to the serial number printed by the binary device. Apparatus of this type will find utility in the coding of bank checks, inventory forms, examination papers to be machine-graded, and the like.

These and other objects and advantages of my invention will more fully appear from the following description, made in connection with the accompanying drawings, wherein like reference characters refer to the same or similar parts throughout the several views and in which.

Figure 1:
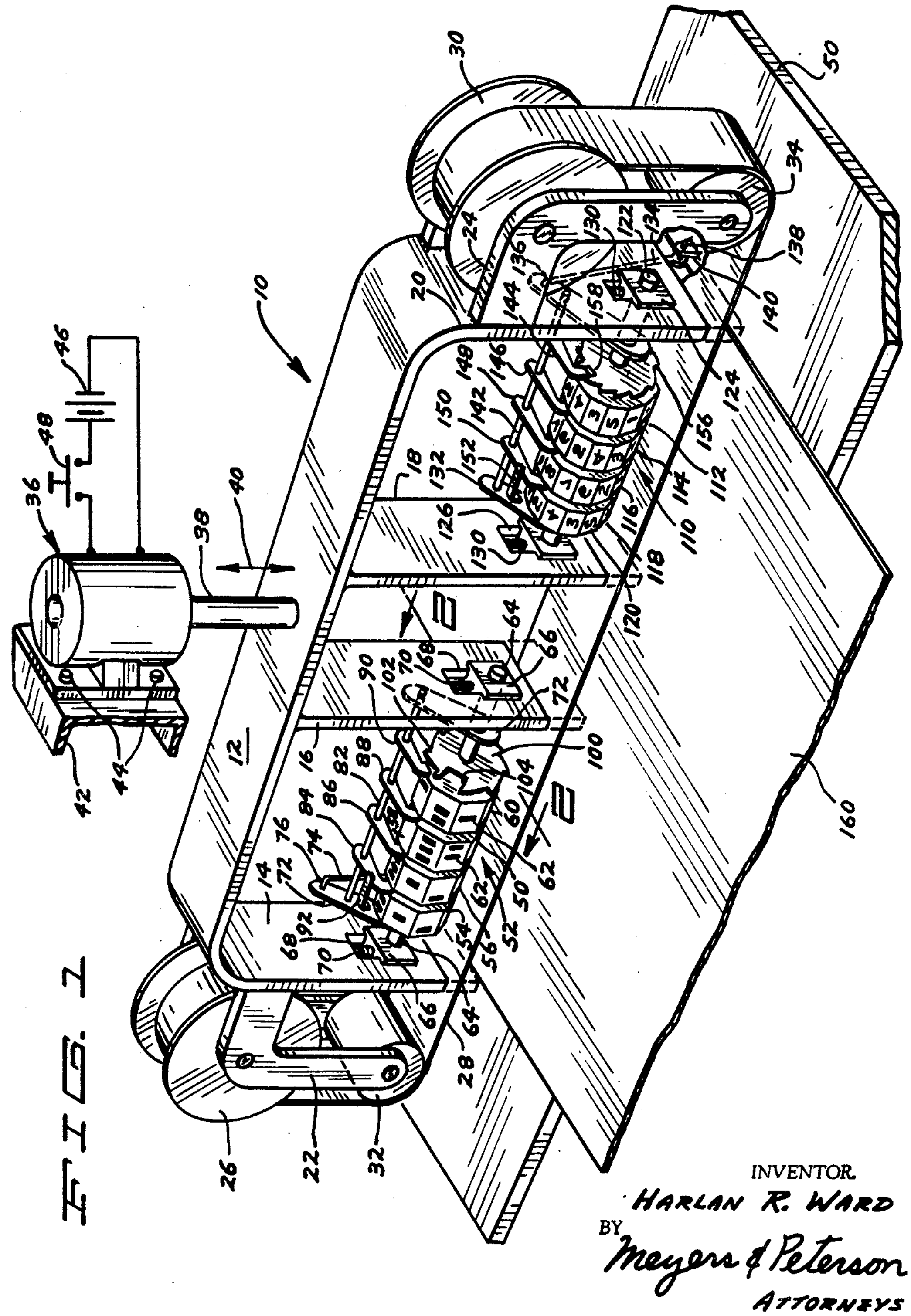
FIGURE 1 is a perspective view of one form my binary and decimal printing apparatus may assume.

Referring now in detail to FIGURE 1, it will be observed that the apparatus that has been selected for the purpose of exemplifying the present invention includes a frame denoted generally by the reference numeral 10. The frame 10 comprises a horizontal bridging portion 12 and four downwardly extending legs 14, 16, 18 and 20. Integral with the opposite ends of the frame 10 are two pairs of L-shaped arms 22, 24. The pair of arms 22 rotatably support a supply spool 26 on which is carried a roll of inked ribbon 28, and the arms 24 rotatably support a take-up spool 30. The ribbon 28 is passed beneath a pair of guide rollers 32, 34.

For the purpose of actuating the frame 10, a solenoid 36 is disposed above, the solenoid 36 including a conventional plunger or armature 38 that is reciprocated in the direction of the double-headed arrow 40. More specifically, when the solenoid 36 is energized, the plunger 38 forces the frame 10 downwardly. As can be seen from FIGURE 1, the solenoid 36 is fixedly mounted on a channel or bracket 42 by means of a plurality of screws 44. The energization of the solenoid is derived from a suitable power source, such as the battery 46, the solenoid being energized each time that a push-button switch 48 is closed.

Also comprising part of the apparatus depicted in FIGURE 1 is a platen 50 that is to be considered as fixedly located. However, it is possible to have the platen 50 move instead of the frame 10.

The first numbering device to be described, denoted generally by the reference numeral 52, prints the binary information. This device 52 includes four octagonally configured wheels 54, 56, 58 and 60, each having binary coded raised or embossed rectangular blocks or type 62. The various wheels 54—60 are mounted for individual rotation on a shaft 64. The shaft 64 in turn is fixedly attached to slidable bearing blocks 66, these bearing blocks being constrained for vertical movement in slots 68. A spring 70 in each slot 68 yieldably urges or biases the shaft 64 downwardly.

Loosely encircling the opposite ends of the shaft 64 are pivotal arms 72. An actuating rod 74 has its upper end bent or turned laterally at 76 so as to engage an aperture provided in the left hand pivotal arm 72. The actuating rod 74 is similarly bent at 78 (FIGURE 2) for attachment to a fixed ear 80 on the platen 50.

Disposed in a parallel relationship with the shaft 64 is a pawl shaft 82 having fixedly attached thereto four pawls 84, 86, 88 and 90, the shaft 82 being journaled by the arms 72. As can be seen from FIGURE 3 (and also to a certain extent from FIGURE 2) these pawls 84—90 have the free ends thereof downturned to different extents for a purpose presently to be explained. The entire shaft 82 and the pawls mounted thereon are biased in a downward direction by a leaf spring 92 affixed at one end to the left arm 72.

Figure 2:
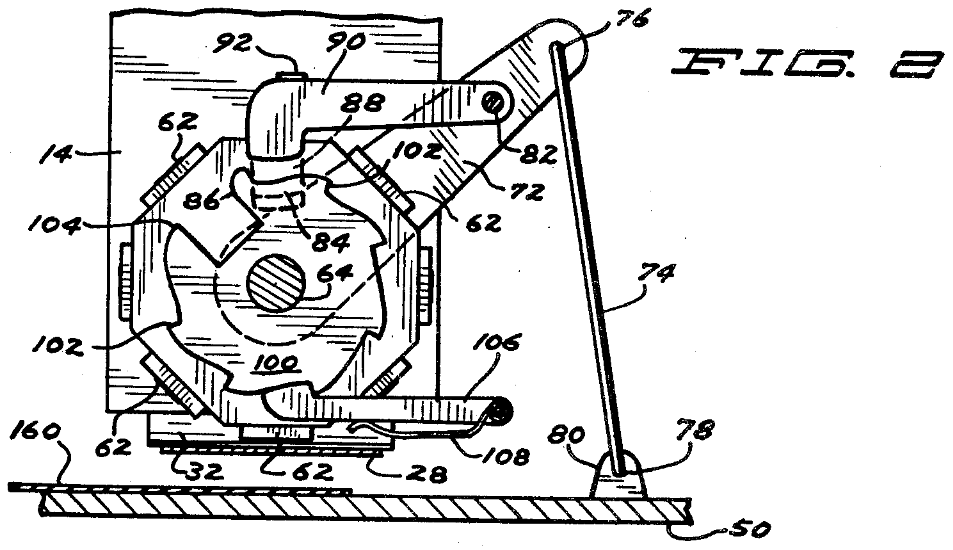
FIGURE 2 is a sectional view taken in the direction of line 2—2 of FIGURE 1.

Attached to the binary wheel 54 is a ratchet 94 and the other binary wheels 56—60 have similarly attached thereto additional ratchets 96, 98 and 100, respectively. These ratchets can be best seen from an inspection of FIGURE 3. The various ratchets 94—100 are provided with teeth 102 and each has a notch 104. It will now be apparent that the free ends of the pawls 84—90 are shaped so as to project into the various notches 104. However, the offset end of the pawl 84 is such as to extend to near the bottom of the notch 104 formed in the ratchet 94. These notches 104, as will become manifest from an operational sequence hereinafter given, are instrumental in obtaining the proper indexing or advancing of the individually mounted binary wheels 54—60. For the purpose of assuring that the various wheels 54—60 will be properly positioned at their printing station, a plurality of detents 106 are utilized, each being urged in the direction of its cooperable ratchet 94—100 by means of a spring 108 (FIGURE 2).

The device for printing the decimal information bears the reference numeral 110. This device includes decagonal shaped wheels 112, 114, 116 and 118, each being provided with raised numerical type 120. Actually, each wheel constitutes a particular order of numerical information and has digits ranging from "0" to "9."

Although the mounting of the decimal wheels 112—118 is generally similar to the binary wheels 54—60, it will be well to point out that a shaft 122 has its opposite ends disposed in slidable bearing blocks 124 constrained for vertical movement in slots 126 formed in the legs 18, 20 of the frame 10. Springs 130 urge the shaft 122 downwardly.

Corresponding to the previously-mentioned arms 22 are pivotal arms 132, these arms having their lower ends loosely encircling the shaft 122. An actuating rod 134 has its opposite ends bent at 136 and 138. The end 136 is pivotally attached to the right arm 132 and the end 138 extends into engagement with an ear 140 on the platen 50.

In a parallel relationship with the shaft 122 is a pawl shaft 142 having four pawls 144, 146, 148 and 150 fixedly carried thereon, the shaft 142 being journaled by the arms 132. These pawls have differently configured offset ends, differing in the amount of offset for the same purpose that the pawls 84—90 differ from each other. The shaft 142 and its pawls 144—150 are biased downwardly in a counterclockwise direction by a leaf spring 152 on the left arm 132. Although only one ratchet 154 is visible in FIGURE 1, it will be appreciated that four such ratchets would be employed, one being affixed to each side of each of the wheels 112—118. These ratchets, as can be discerned from the ratchet 154, are equipped with teeth 156 and each has a notch 158. The teeth 156 differ in number from the teeth 102 because the decimal wheels of the device 110 are advanced less incrementally speaking, than are the set of binary wheels of the device 52. As with the previously-mentioned ratchets 94—100, each ratchet 154 would be provided with a spring-pressed detent corresponding to the detents 106.

Figures 3, 4, 5:
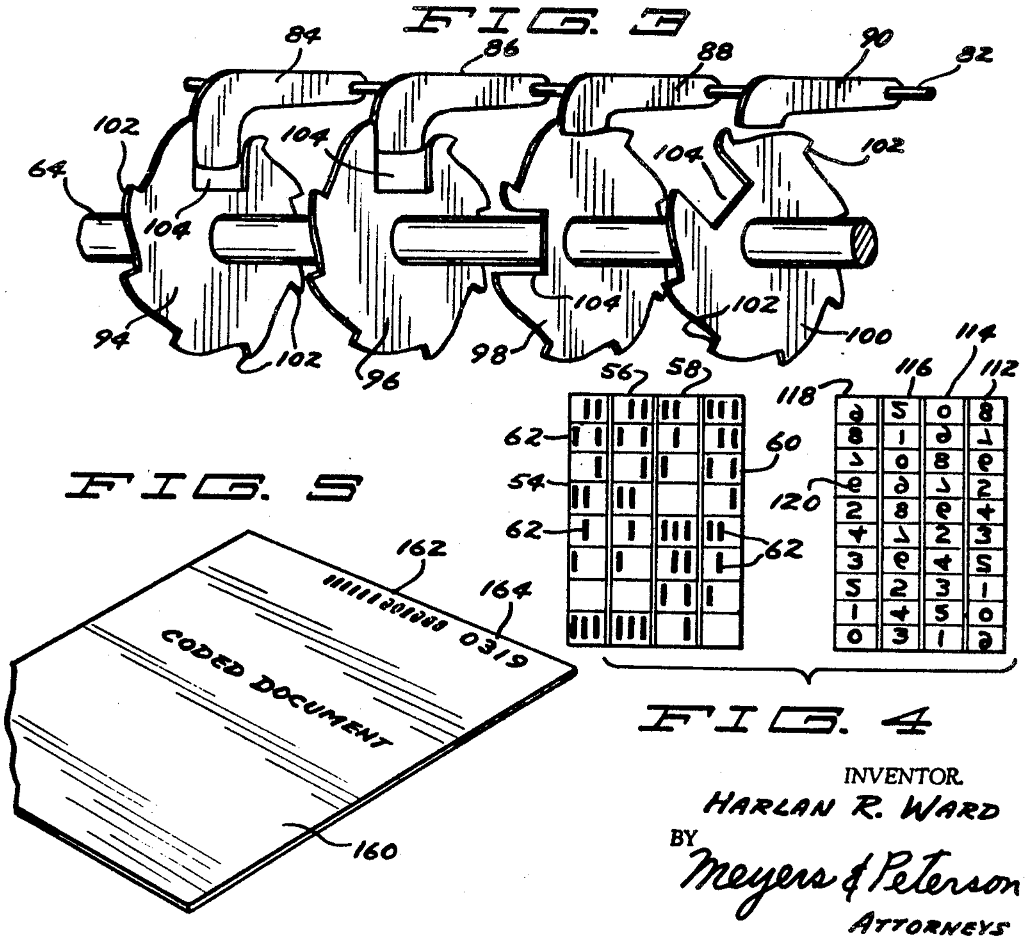
FIGURE 3 is a perspective view of the pawl and ratchet mechanism used in the advancing or indexing of the various binary printing wheels.
FIGURE 4 is a plan view of the various binary and decimal printing wheels in a developed form, the lowermost row of information being that which is printed when the apparatus of FIGURE 1 is actuated.
FIGURE 5 is a perspective view of a coded document having printed thereon an arbitrarily selected binary number and its decimal equivalent.

Although the binary code is well known, FIGURE 4 has been included herewith for the purpose of showing the complete code pattern that would be used on the set of binary wheels. The binary system and its relationship to the decimal system is explained in a number of textbooks dealing with data processing techniques and computer programming; see for instance page 34 of "Digital Computer Programming," by D. D. McCracken, published by John Wiley & Sons, Inc., 1957. More specifically, the various flats, there being eight in number, are pictured in a developed or laid-out form in FIGURE 4. The lowermost row of binary blocks 62 are representative of the decimal number "319." The set of decimal wheels 112—118 have been shown in a developed or laid-out fashion to the right in FIGURE 4, and it will be perceived that the lowermost row of numerical type 120 would print the decimal number "319."

Attention is now directed to FIGURE 5 where a coded sheet or document 160 has been illustrated. This document may assume a variety of forms and on which is contained coded information that is to be interpreted by a data processing system. For instance, the particular document 160 might well constitute an examination sheet that is to be optically scanned by the processing system. The number represented by the lowermost row of blocks or type 62 in FIGURE 4 has been shown at 162 in FIGURE 5 and the decimal equivalent derived from the lowermost row of type 120 shown in FIGURE 4 has been assigned the reference numeral 164 in FIGURE 5. Hence, the printed binary code 162 has its decimal equivalent 164 printed in a proximal relation therewith. The particular number, as already indicated, is "319."

Having presented the foregoing information, the manner in which my printing apparatus operates should be readily understood. Because the number "319" has been selected, it will be assumed that 318 such documents have already been placed between the frame 10 and the platen 50. The document 160 is shown in such a relationship. When the first of these documents is placed in the manner that the document 160 is pictured, the operator would merely depress the switch 48 and the frame 10 would move downwardly to bring the two sets of wheels 54—60 and 112—118 against the ribbon 28 to print the binary number "1" and its decimal equivalent. The first of the documents would then be withdrawn and a second similarly inserted.

Each time that the frame 10 moves downwardly, the respective actuating rods 74 and 134 cause an indexing or an advancing of the binary device 52 and the decimal device 110. It will be understood that the pawl 84 falls into the notch 104 formed in the ratchet 94. It is only then that the next adjacent pawl 86 can engage the teeth 102 of its ratchet 96. In this way, the various orders of binary information are achieved, there being a difference of only one binary digit each time that the solenoid 36 is energized.

By the same token, the pawl 150 would successively engage the various teeth 156 of the ratchet 154 (this being the only one visible), until the notch 158 is engaged. At this time, the next pawl 148 would be lowered sufficiently to cause the advancement of the wheel 116, and so on by reason of the various notches that are present in the ratchets that are not visible. The springs 70 and 130 compress sufficiently so that the two wheels of the two devices 52 and 110 will always bear firmly against the upper side of the ribbon 28 so that the particular document that has been inserted thereunder will receive a good print of the row of type that is lowermost or at the printing station.

Any preferred number of printing wheels can be employed. Also, although the present invention has been described in conjunction with printing apparatus, it will be appreciated that instead of the inked ribbon 28, an application of magnetic ink can be made instead of the inking that occurs. Still further, it is within the purview of the invention to utilize punches so that perforations would be made in the document 160 according to the binary code that has been mentioned, the decimal equivalent thereof being printed or perforated alongside in the same basic manner as has been specifically herein disclosed.

It will, of course, be understood that various changes may be made in the form, details, arrangements and proportions of the parts without departing from the scope of my invention as set forth in the appended claims.

What is claimed:

1. A binary printer with decimal display comprising:
   (*a*) a first set of individually positionable printing wheels having binary representations disposed at various angular locations thereabout;
   (*b*) a second set of individually positionable printing wheels having decimal representations disposed at various angular locations thereabout having a different angular spacing from said first-mentioned angular locations;
   (*c*) means for sequentially advancing through successive orders said first set of wheels from one angular position to the next in accordance with the spacing of said first-mentioned angular locations to produce at a printing station progressive binary counts in which each count differs from the preceding count by one binary digit; and
   (*d*) means for simultaneously advancing through successive orders said second set of wheels from one angular position to the next in accordance with the spacing of said second-mentioned angular locations to produce decimal counts at a second printing station which decimal counts always correspond in value to said binary counts.

2. A binary printer in accordance with claim 1 including:
   (*a*) first and second shafts;
   (*b*) said first set of wheels being rotatably supported on said first shaft; and
   (*c*) said second set of wheels being rotatably supported on said second shaft.

3. A binary printer in accordance with claim 2 including:
   (*a*) frame means for mounting said shafts in a generally axial relationship with each other so that said first and second printing stations are oriented in an end-to-end relationship.

4. A binary printer in accordance with claim 3 including:
   (*a*) a solenoid for reciprocating said frame means to effect the simultaneous advancing of said first and second sets of wheels.

5. A binary printer in accordance with claim 4 in which said respective advancing means include:
   (*a*) a ratchet member affixed to each wheel, the ratchet members for said first set of wheels each having eight teeth and the ratchet members for said second set of wheels each having ten teeth; and (*b*) a pawl member for each ratchet member oscillatable by the reciprocal movement of said frame means and engageable with the teeth of the ratchet member with which it is associated to index said wheels from one angular position to the next to obtain said count correspondence.

6. A binary printer with decimal display comprising:

(*a*) a first set of individually rotatable printing wheels having eight binary representations disposed at equal angular locations thereabout;

(*b*) a ratchet member affixed to each wheel and each ratchet member having eight teeth equally spaced about its periphery with two adjacent teeth of each member having a notch therebetween;

(*c*) a pawl member for each ratchet member having angularly directed ends of different lengths capable of projecting into the notch of the ratchet member with which it is associated when said notch is aligned therewith;

(*d*) a second set of individually rotatable printing wheels having ten decimal representations disposed at equal angular locations thereabout;

(*e*) a ratchet member affixed to each wheel of said second set and each of said last-mentioned ratchet members having ten teeth equally spaced about its periphery with two adjacent teeth of each of said last-mentioned ratchet members having a notch therebetween;

(*f*) a pawl member for each of said last-mentioned ratchet members having angularly directed ends of different lengths capable of projecting into the notch of the last-mentioned ratchet member with which it is associated when said notch is aligned therewith;

(*g*) means for simultaneously oscillating all of said pawl members to advance said printing wheels through successive orders determined by the spacing of the teeth on said ratchet members allowed by progressive alignment of said notches with the angularly directed ends of said pawl members.

References Cited in the file of this patent

UNITED STATES PATENTS

| | | |
|---|---|---|
| 1,251,887 | Hoffman | Jan. 1, 1918 |
| 1,494,184 | Pannier | May 13, 1924 |
| 1,552,108 | Batdorf | Sept. 1, 1925 |
| 2,214,895 | Ayrbach | Sept. 17, 1940 |
| 2,293,713 | Connor | Aug. 25, 1942 |
| 2,582,187 | Wolowitz | Jan. 8, 1952 |
| 2,801,583 | Loushay | Aug. 6, 1957 |
| 2,943,559 | Rothmann | July 5, 1960 |
| 2,981,179 | Schwend | Apr. 25, 1961 |